United States Patent
Kitazaki et al.

(10) Patent No.: US 6,879,459 B2
(45) Date of Patent: Apr. 12, 2005

(54) POSITIONING CONTROL MECHANISM FOR A MAGNETIC HEAD IN A MAGNETIC STORAGE DEVICE

(75) Inventors: Nobuyuki Kitazaki, Fujisawa (JP); Tomoharu Maeno, Ebina (JP); Nobuya Matsubara, Fujisawa (JP); Tomokazu Suzuki, Fujisawa (JP)

(73) Assignee: Hitachi Global Storage Technologies Netherlands B.V., Amsterdam (NL)

(*) Notice: Subject to any disclaimer, the term of this patent is extended or adjusted under 35 U.S.C. 154(b) by 40 days.

(21) Appl. No.: 10/652,760

(22) Filed: Aug. 29, 2003

(65) Prior Publication Data

US 2004/0120069 A1 Jun. 24, 2004

(30) Foreign Application Priority Data

Nov. 26, 2002 (JP) .......................................... 2002-342139

(51) Int. Cl.⁷ .............................................. G11B 21/02
(52) U.S. Cl. ....................................... 360/75; 360/77.04
(58) Field of Search .................................. 360/75, 77.04, 360/77.08, 31, 25, 77.12, 78.06, 78.14

(56) References Cited

U.S. PATENT DOCUMENTS

| | | | | |
|---|---|---|---|---|
| 5,844,742 A | * | 12/1998 | Yarmchuk et al. | 360/75 |
| 5,940,240 A | * | 8/1999 | Kupferman | 360/77.08 |
| 5,946,158 A | * | 8/1999 | Nazarian et al. | 360/77.04 |
| 6,031,683 A | * | 2/2000 | Iverson et al. | 360/78.04 |
| 6,369,974 B1 | * | 4/2002 | Asgari et al. | 360/78.14 |
| 6,476,998 B2 | * | 11/2002 | Cheung | 360/78.06 |
| 6,757,128 B2 | * | 6/2004 | Yip | 360/77.12 |

* cited by examiner

Primary Examiner—Sinh Tran
Assistant Examiner—Fred F. Tzeng
(74) Attorney, Agent, or Firm—Ronald B. Feece

(57) ABSTRACT

A mechanism to allow accurate control of the position of a magnetic head even if the state of the magnetic head has changed due to instability.

16 Claims, 9 Drawing Sheets

POSITIONING CONTROL MECHANISM FOR A MAGNETIC HEAD IN A MAGNETIC STORAGE DEVICE

FIELD OF THE INVENTION

The present invention relates to positioning control of a magnetic head in a magnetic storage device and, in particular, to adjustment of a position error signal (PES) used in the positioning control.

BACKGROUND ART

Generally in a data storage device where a recording surface of a recording medium is scanned with a head to read and write data, a servo pattern written to the recording medium is read by the head to carry out servo control (hereinafter, positioning control) for positioning the head as means to raise data recording density. In the positioning control, a position error signal (hereinafter abbreviated as PES) is generated based on the servo pattern read out by the head from the recording medium and the head position is recognized based on this PES.

Nowadays, magnetic disk drives using magnetic disks as recording media are being used widely as external storage devices of computers. In addition, magnetic disk drives are also becoming popular as recorders of motion picture data and sound data. Also in a magnetic storage device as represented by these magnetic disk drives, a servo pattern recorded on a magnetic recording medium is read out by a magnetic head to acquire a PES and the position of the magnetic head is recognized based on this PES to carry out positioning control of the magnetic head (for example, see Patent Document 1).

Incidentally, the characteristics of the PES are unique to each head, that is, each manufactured data storage device provided with a head has different PES characteristics. Therefore, it is necessary to adjust the control system of each data storage device in its manufacture process and the like so that the head position can accurately be grasped from the PES.

To accurately recognize the position and amount of displacement of the magnetic head from the PES gain, it is desirable that the change of the PES gain is proportional to the amount of displacement of the magnetic head. In reality, however, the relation between the change of the acquired PES gain and the amount of displacement of the magnetic head is discontinuous and non-linear due to the characteristics and error of the magnetic head. Therefore, adjusting compensation is made for the sensitivity (head gain) of the magnetic head and the nonlinear relation between the PES gain and the change of the amount of displacement of the magnetic head so that the change of the PES gain and the displacement of the magnetic head have a proportional relation.

[Patent Document]

Japanese Patent Laid-open No. 8-124136

As mentioned above, as long as positioning control uses a servo pattern recorded on a recording medium, the control system must initially be adjusted according to the characteristics of the head.

However, the MR (Magneto Resistive) head, which is being used widely to read magnetically recorded data, shows a phenomenon called instability in which the condition of the magnetic head changes. If this instability occurs, since the magnetic head's susceptibility to off-track changes, not only the PES gain in the same situation but also the non-linear relation between the change of the PES gain and the amount of displacement of the magnetic head become different from the characteristics for which initial adjustment was made. Accordingly, accurate positioning control is not possible for the magnetic head if the control system is adjusted only initially.

SUMMARY OF THE INVENTION

Therefore, it is an advantage of the present invention to allow a magnetic storage device to accurately control the position of a magnetic head even if the condition of the magnetic head changes.

To achieve the above-cited object, the present invention is implemented as a magnetic storage device. This device comprises: a magnetic head which is mounted on an actuator and reads information recorded on the magnetic recording medium; a voice coil motor which operates the actuator to move the magnetic head to a desired track on the magnetic recording medium; a MPU (Micro Processing Unit) provided with a positioning control function to position the magnetic head by controlling the voice coil motor; and a channel circuit which obtains read signals from burst signals read by the magnetic head from the recording medium on which the burst signals are recorded and feeds back information about the read signal to the MPU. The device is characterized in that if a state change is detected in the magnetic head based on the information obtained from the channel circuit, the MPU updates the parameters which are to be used by the positioning control function according to the state change.

Preferably, the positioning control function implemented by the MPU comprises: state change detection means for judging whether a state change has occurred in the magnetic head; position error signal adjustment means for adjusting a position error signal if it is judged by said state change detection means that a state change has occurred in the magnetic head, wherein the position error signal is obtained by processing read signals read from a magnetic recording medium by the magnetic head; and control execution means for performing positioning control of the magnetic head by using the parameters obtained through processing by the position error signal adjustment means.

More specifically, the position error signal adjustment means carries out PES gain calibration and linear compensation. In the PES gain calibration, the gain of the position error signal obtained by processing read signals read from the magnetic recording medium is adjusted by the magnetic head so as to change continuously according to the displacement of the magnetic head. In the linear compensation, the gains of plural position error signals obtained by processing read signals retrieved from plural points in a track on the magnetic recording medium are compensated so as to have a linear relation with the position of the magnetic head.

The state change detection means compares the gain of a variable gain amplifier constituting a channel circuit and the balance of amplitude between read signals retrieved from the magnetic recording medium with their respective initial values and, based on the result of the comparison, judges whether a state change has occurred due to instability in the magnetic head.

In addition, as another function, the MPU may further comprises MCS detection means for detecting the magnetically central section (MCS) of the magnetic head if it is judged by the state change detection means that a state change has occurred in the magnetic head. To be more specific, this MCS detection means detects the magnetically central section of the magnetic head after the occurrence of said state change based on the position of the magnetic head at which a read signal obtained by the magnetic head which reads a prescribed pattern recorded in a prescribed track on the magnetic disk has the largest amplitude while the magnetic head is moved across the track. The control execution means performs positioning control of the magnetic head by taking into consideration the magnetically central section of the magnetic head after the occurrence of the state change.

To achieve the above-cited object, the present invention is also implemented as a magnetic head positioning control method by which a magnetic head for reading and writing data from and onto a magnetic recording medium is located on a track of the magnetic recording medium. This magnetic head positioning control method comprises the steps of: setting, according to the magnetic characteristics of the magnetic head, parameters which are used for positioning control of the magnetic head; judging whether a state change has occurred in the magnetic head; and if it is judged that a state change has occurred in the magnetic head, updating said parameters according to the state change.

DETAILED DESCRIPTION OF THE PREFERRED EMBODIMENTS

The following will describe the present invention based on the embodiment shown in the accompanying drawings. This embodiment is an example of a hard disk drive using a magnetic disk as a magnetic recording medium.

Figure 1:
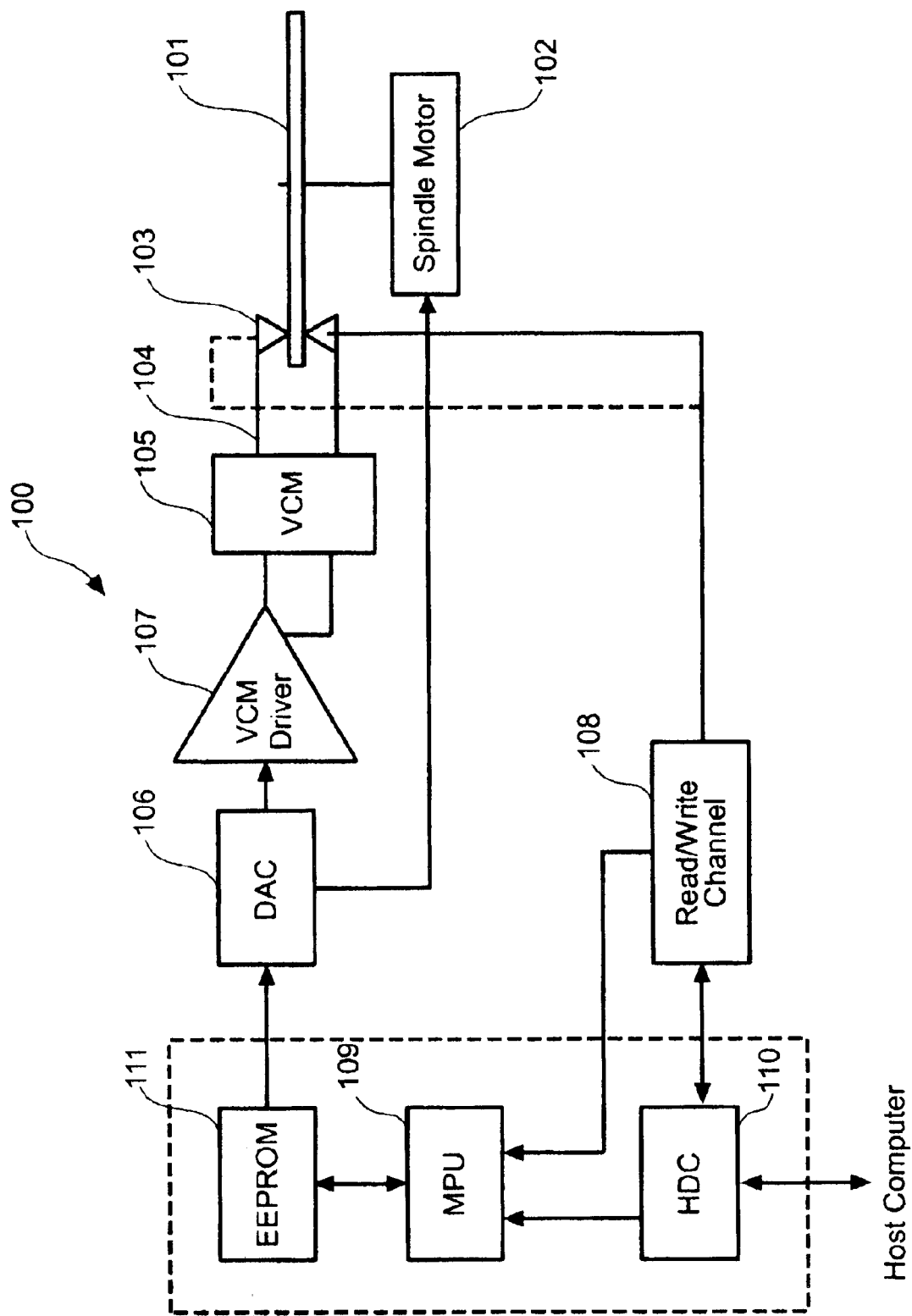
FIG. 1 is a block diagram showing the general configuration of a hard disk drive according to an embodiment of the present invention.

FIG. 1 is a block diagram showing the configuration of the main portion of a hard disk drive 100.

The hard disk drive 100 is a data storage and retrieval device in which a magnetic head 103 seeks and stays at an appointed track (position) on a magnetic disk 101 driven rotationally by a spindle motor 102 and writes data to the magnetic disk 101 and reads data written to the magnetic disk 100. The magnetic disk 101 is a recording medium to record data as magnetic information. Although a single magnetic disk is shown in the example of FIG. 1, a plurality of magnetic disks may also be mounted as necessary.

While the hard disk drive 100 is in operation, the magnetic disk 101 continues to be driven to rotate around the spindle shaft of the spindle motor 102. While the hard disk drive 100 is not in operation, the magnetic disk 101 stops rotating (at rest). Two magnetic heads 103 are held at the front end of the actuator 104 and act respectively on the top and bottom surfaces of the magnetic disk 101. They implement data write and read to and from the magnetic disk 101. Used generally as the magnetic heads 103 are composite type heads each of which has an inductive head for writing data and a MR head for reading data.

The actuator 104 is driven by a voice coil motor (VCM) 105 which is controlled by a MPU (Micro Processing Unit) 109 via a digital/analog converter (DAC) 106 and a voice coil motor (VCM) driver 107.

A read write channel (channel circuit 108) executes data read/write operation. That is, for data write, write data which is sent from a host computer via a HDC (Hard Disk Controller) 110 is converted to a write signal (current) and supplied to a magnetic head 103. The magnetic head 103, based on this write current, executes data write to the magnetic disk 101. Meanwhile, for data read, a read signal (current) obtained from the magnetic disk 101 is converted to digital data and output to a host computer via the HDC 110.

The HDC 110 has functions as an interface of the hard disk drive 100. One of the functions is to receive write data sent from a host computer and transfer it to the read/write channel 108. In addition, the HDC 110 receives read date sent from the read write channel 108 and transfers it to a host computer. Further, the HDC 110 receives a directive command or the like from a host computer and transfers it to the MPU 100.

The MPU 109 takes responsibility for the control of the hard disk drive 100. In an EEPROM 111, programs (microcodes) to implement various functions by controlling the operation of the MPU 109 and parameters to be used in the control processing are stored.

The positioning control mechanism for the magnetic head 103 which uses a servo pattern recorded on the magnetic disk 101 is a servo loop comprising the read write channel 108, the MPU 109, the DAC 106, the VCM driver 107, the VCM 105 and the magnetic head 103.

The difference between the magnetic head position information obtained from a signal read by the magnetic head 103 and the target position information is returned by the MPU 109 to the VCM driver 107, i.e., a power amplifier. This results in controlling the VCM 105 so as to adjust the magnetic head 103 to an appropriate position. Note that the various functions of the MPU 109, including this position control function, are implemented by the programs and parameters stored in the EEPROM 11 which is incorporated in the hard disk drive 100 and can be accessed from the MPU 109.

Note that actually, the positioning control mechanism is further provided with a synchronous component detecting function and a feed forward function. To cope with the variations in the write accuracy of the servo pattern (described later in detail) recorded on the magnetic disk, the synchronous component detecting function extracts periodic signal components and the feed forward function reflects the extracted periodic signal components in the control. Since they are secondary functions to cope with the oscillations or the like of the motor, the description is omitted herein for simplicity.

A method will then be more detailed of positioning the magnetic bead 103 by using the servo pattern recorded on the magnetic disk 101. The servo pattern written to the magnetic disk 101 for the purpose of servo control includes track data and sector data which identify tracks and sectors on the magnetic disk 101 and burst signals which provide information about the position of the magnetic head relative to a track.

Figure 3:
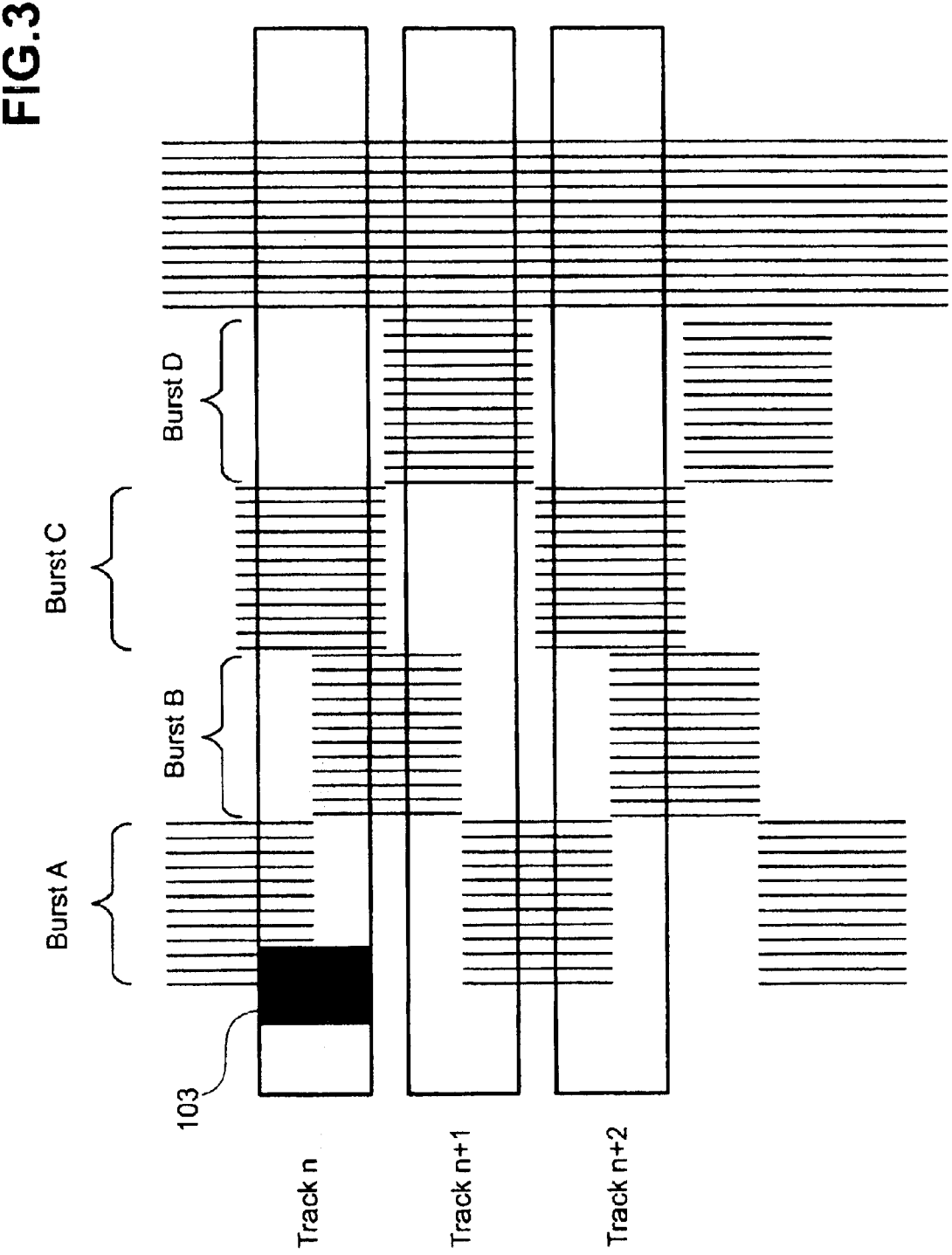
FIG. 3 shows burst signals recorded on a magnetic disk as a servo pattern.

FIG. 3 shows burst signals which are recorded on the magnetic disk 101 as a servo pattern. If the magnetic head 103 moves over a track, signals corresponding to bursts A, B, C and D are read in this order. According to bursts A and B shown in FIG. 3, the center (MCS) of the magnetic head 103 moves along the center of the track if the respective read signals obtained from bursts A and B are identical in amplitude.

In the system shown in FIG. 1, the magnetic head 103 reads bursts A through D and the read write channel 108 obtains read signals by peak-holding the read bursts at their respective read signal timings and perform A-D conversion of the read signals. From the A/D-converted read signals (burst values), the MPU 109 obtains a PES to recognize the position of the magnetic head 103.

Bursts C and D have a phase difference of 90 degrees from bursts A and B, respectively. Depending on the position of the magnetic head 103 in the track, bursts A and B or bursts C and D are used to recognize the position of the magnetic head 103. More specifically, the PES obtained from the burst values of bursts A and B is assumed as the MPES while the PES obtained from the burst values of bursts C and D is assumed SPES. The MPES is used when the magnetic head 103 is near to the center of the track while the SPES is used when the magnetic head 103 is near to either edge of the track. Specifically, the track is divided uniformly into 256 longitudinal divisions numbered 0 through 255. If the MCS of the magnetic head 103 is in any of divisions 0 (one edge of the track) through 64 and divisions 192 through 255 (the other edge of the track), the SPES is used to recognize the position. Likewise, if the MCS of the magnetic head 103 is in any of the intermediate divisions 64 through 192, the MPES is used.

The MPES and SPES are calculated respectively according to Equation 1 as below.

$$MPES = 4 \times \{(A-B)/(A+B)\} \times (\text{Head Gain})$$

$$SPES = 4 \times \{(C-D)/(C+D)\} \times (\text{Head Gain}) \quad [\text{Equation 1}]$$

where, A is the burst value of burst A, B is the burst value of burst B, C is the burst value of burst C, D is the burst value of burst D and Head Gain is the gain of the magnetic head 103.

Figure 4:
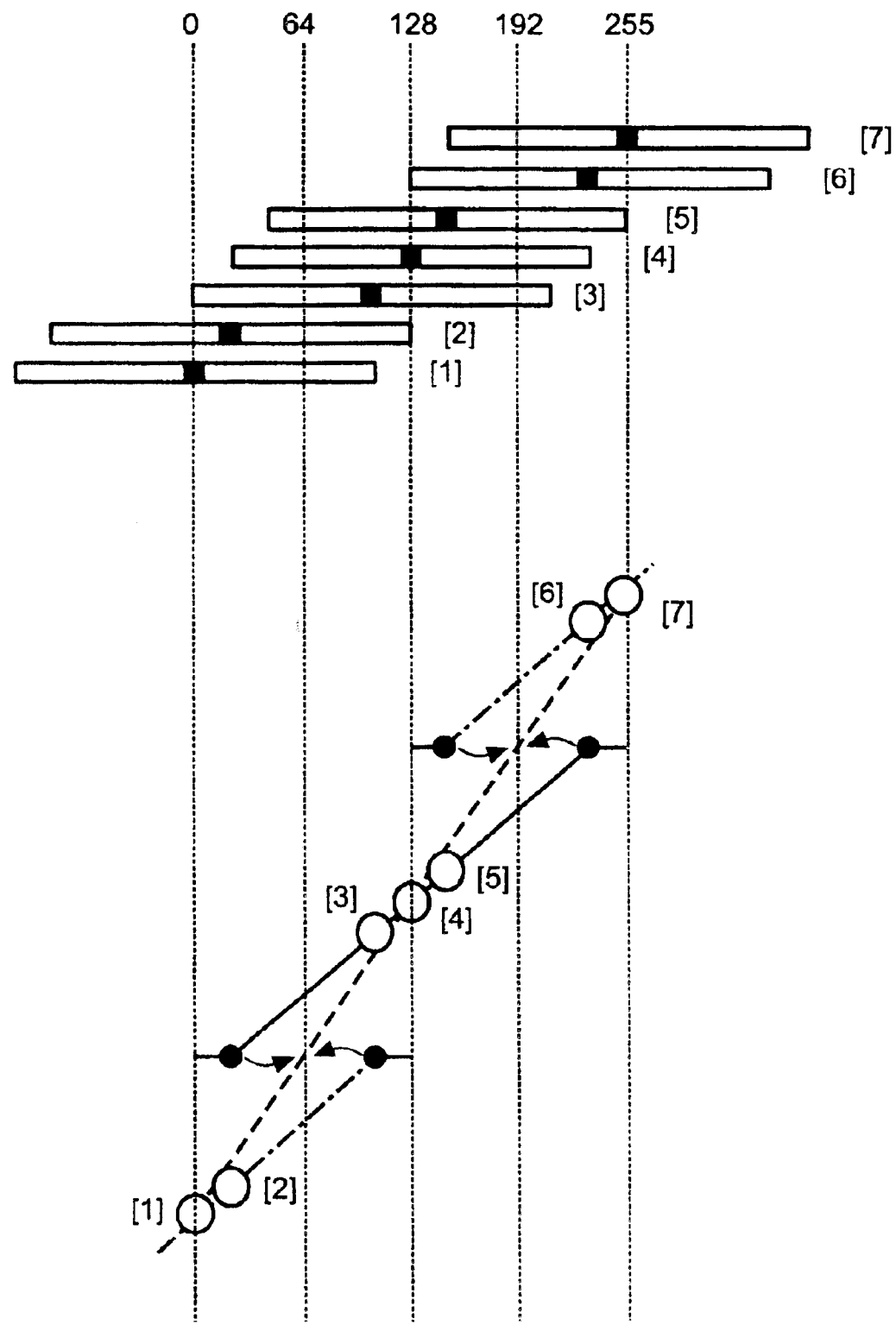
FIG. 4 is a diagram for explaining the relation between the position of a magnetic head relative to a track on a magnetic disk and the PES gain.

FIG. 4 is a diagram explaining the relation between the position of the magnetic head 103 relative to a track on the magnetic disk 101 and the PES gain.

In FIG. 4, seven positions ([1] through [7]) of the magnetic head 103 are assumed in a track and the PES gains corresponding to these positions are plotted (hollow circles) on their respective lines. Of positions [1] through [7], position [1] means that the physical center (filled in black in FIG. 4) of the magnetic head 103 is in division 0 of the aforementioned 256 divisions constituting the track. Position [2] means that one end of the magnetic head 103 (the right end of the magnetic head 103 shown) is in division 124 (center) of the 256 divisions of the track. Position [3] means that one end of the magnetic head 103 (the left end of the magnetic head 103 shown) is in division 0 of the 256 divisions of the track. Position [4] means that the physical center of the magnetic head 103 is in division 124 of the 256 divisions of the track. Position [5] means that one end of the magnetic head 103 (the right end of the magnetic head 103 shown) is in division 255 of the 256 divisions of the track. Position [6] means that one end of the magnetic head 103 (the left end of the magnetic head 103 shown) is in division 128 of the 256 divisions of the track. Position [7] means that the physical center of the magnetic head is in division 255 of the 256 divisions of the track.

To recognize the position of the magnetic head 103, the SPES according to the burst values of bursts C and D is used when the magnetic head 103 is at positions [1] and [2] near one end of the track (division 0 of the aforementioned 256 divisions). Likewise, when the head 103 is at positions [3], [4] and [5] near the center of the track (division 128 of the aforementioned 256 divisions), the MPES according to the burst values of bursts A and B is used. When the head 103 is at positions [6] and [7] near the other end of the track (division 255 of the aforementioned 256 divisions), the SPEC according to the burst values of bursts C and D.

Here, assume a straight line (shown as a dashed line in FIG. 4) connecting the PES gains which are obtained respectively when the MCS of the magnetic head 103 is at positions [1] and [2]. (These PES gains are denoted below as PES gain [1] and PES gain [2]. This notation is also employed for the other PES gains.) Likewise, assume a straight line (shown as an solid line in FIG. 4) connecting PES gain [3], PES gain [4] and PES gain [5] and a straight line (shown as a dashed line in FIG. 4) connecting PES gain [6] and PES gain [7]. In addition, assume a straight line (shown as a broken line in FIG. 4) connecting PES gain [1] and PES gain [7], which are obtained respectively when the MCS of the magnetic head 103 is at the ends of the track (divisions 0 and 255 of the 256 divisions), and PES gain [4] obtained when the MCS of the magnetic head 103 is at the center of the track.

Of the straight lines assumed above, the solid PES gain line represents MPES gains while the dashed PES gain lines represent SPES gains. In addition, the broken line represents an ideal PES gain characteristic.

If the MPES gains and SPES gains are discontinuous (i.e., they are not aligned with the broken line) as shown in FIG. 4, it is not possible to know the accurate position of the magnetic head 103 from the PES gain. For example, the PES gain may remain unchanged even when the magnetic head 103 is actually moving. Note that in the example of FIG. 4, the gradient of the MPES gain line and that of the SPES gain lines are gentler than the broken line indicating an ideal PES gain characteristic. Needless to say, PES gains are also discontinuous when both gradients are sharper than the broken line.

Therefore, in the manufacture process or the like of the actual hard disk drive 100, calculation of PES gains from actual burst values are calibrated by changing the sensitivity (head gain) of the magnetic head 103 so that the gradient of each PES gain line is adjusted to that of the broken line (PES gain calibration). By applying this calibration to the calculation of PES gains from detected burst values, it is made possible to observe the magnetic head 103 moving continuously.

In addition, if MPES and SPES gains are obtained in finer steps of displacement of the magnetic head 103, the actual lines connecting the PES gains are not perfectly linear and include a small error for each position of the magnetic head 103 although this is not apparent in FIG. 4.

Therefore, in the actual hard disk drive 100, the burst values of bursts A, B, C and D are actually measured at a plurality of positions, e.g., some twenty divisions of 256 divisions of the track shown in FIG. 4, and processed so that the calculated PES gains become linear. This processing is carried out by measuring the transfer function of the device itself, determining its cross point and compensating the burst values so as to make the PES gains have a target level of linearity. By this compensation, it is made possible to smoothly follow the displacement of the magnetic head 103 according to the change of the PES gain.

Calibration parameters and burst value compensation parameters, which are determined as a result of the initial adjustment in which the gradient of PES gains is adjusted and PES gains are linearized, are stored in the EEPROM 111 accessible from the MPU 109 and will be used in the positioning control of the magnetic head 103 when the hard disk drive 100 is in operation.

Figure 5:
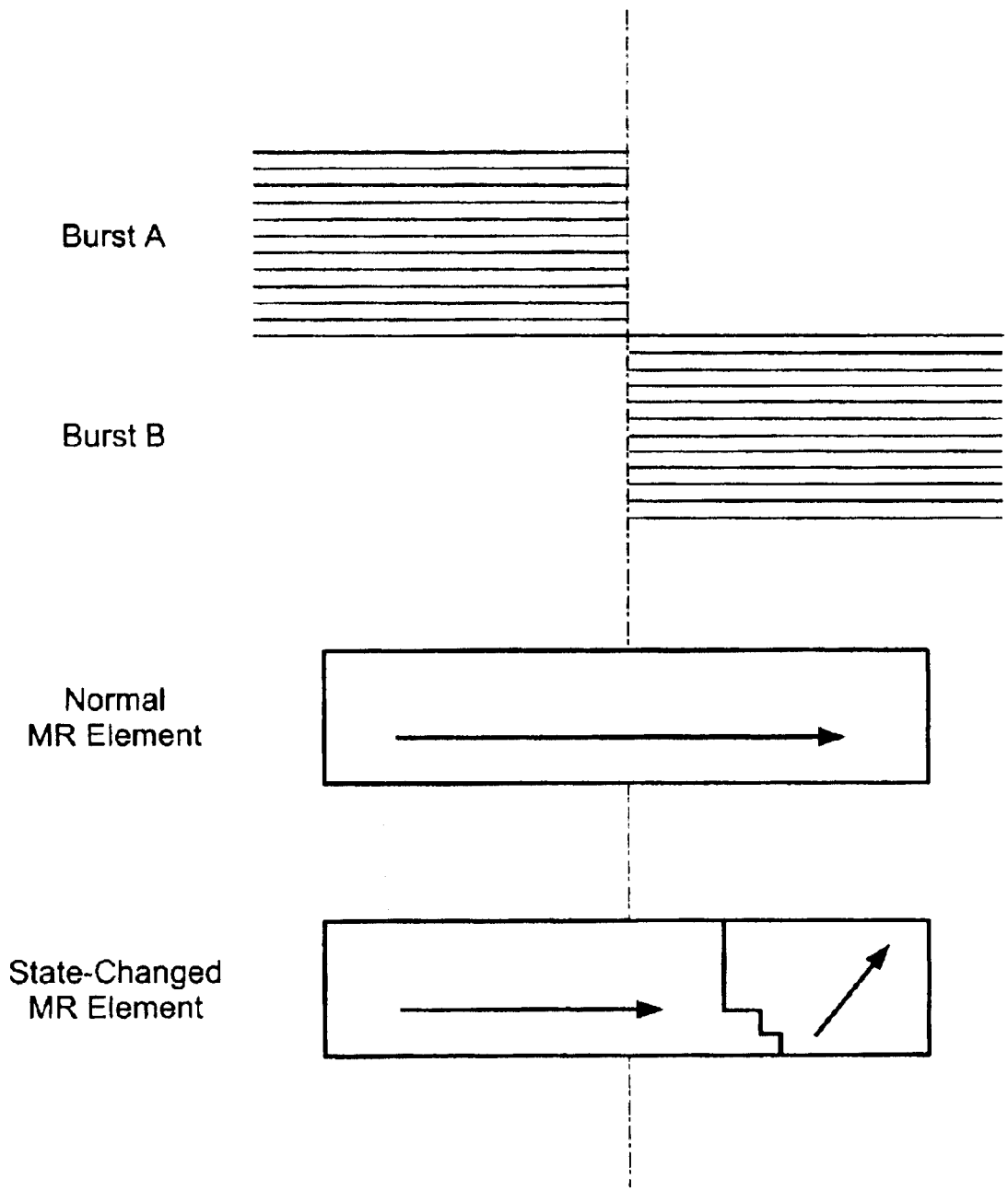
FIG. 5 shows a state change of magnetic characteristics which has occurred in a data read MR head due to instability.

Then, the instability of the magnetic head 103 will be explained. FIG. 5 shows how the data read MR head of the magnetic head 103 changes its state of magnetic characteristics in case of instability. The MR head reads information (signals) recorded on the magnetic disk 101 by its MR element which detects magnetic transitions in the magnetic layer (recording layer) of the magnetic disk 101. As shown in FIG. 5, the magnetic transition detecting axis of the MR element is directed to a fixed direction (longitudinal as indicated by an arrow in FIG. 5) when the MR element is normal. In the case of a state-changed MR element, however, the axial direction is deviated in part of the MR element.

If a state change occurred in the MR element as shown in FIG. 5, it is not possible for the whole MR element to uniformly detect magnetic transitions since the sensibility of its normal portion to a magnetic field is different from the sensibility of its state-changed portion. For example, if the state-changed MR head reads bursts A and B while its physical center is tracing the center of a track as shown in FIG. 5, the amplitude of the signal read from burst A is not equal to that read from burst B although the physical center of the MR head is at the center of the track. In addition, if a state change occurs in a MR head due to instability, the total gain of the MR head changes since this changes the sensibility of the MR element to a magnetic field.

Therefore, if the magnetic head 103 has such a state change, the positioning control mechanism does not function properly since calibration of the gradient of PES gains and linearization of PES gains, which were done as the initial adjustment as mentioned earlier, become inconsistent with characteristics of the magnetic head 103. Therefore, if the magnetic head 103 has a state change due to instability, the positioning control mechanism in the present embodiment performs adjustment again for PES gains.

Figure 2:
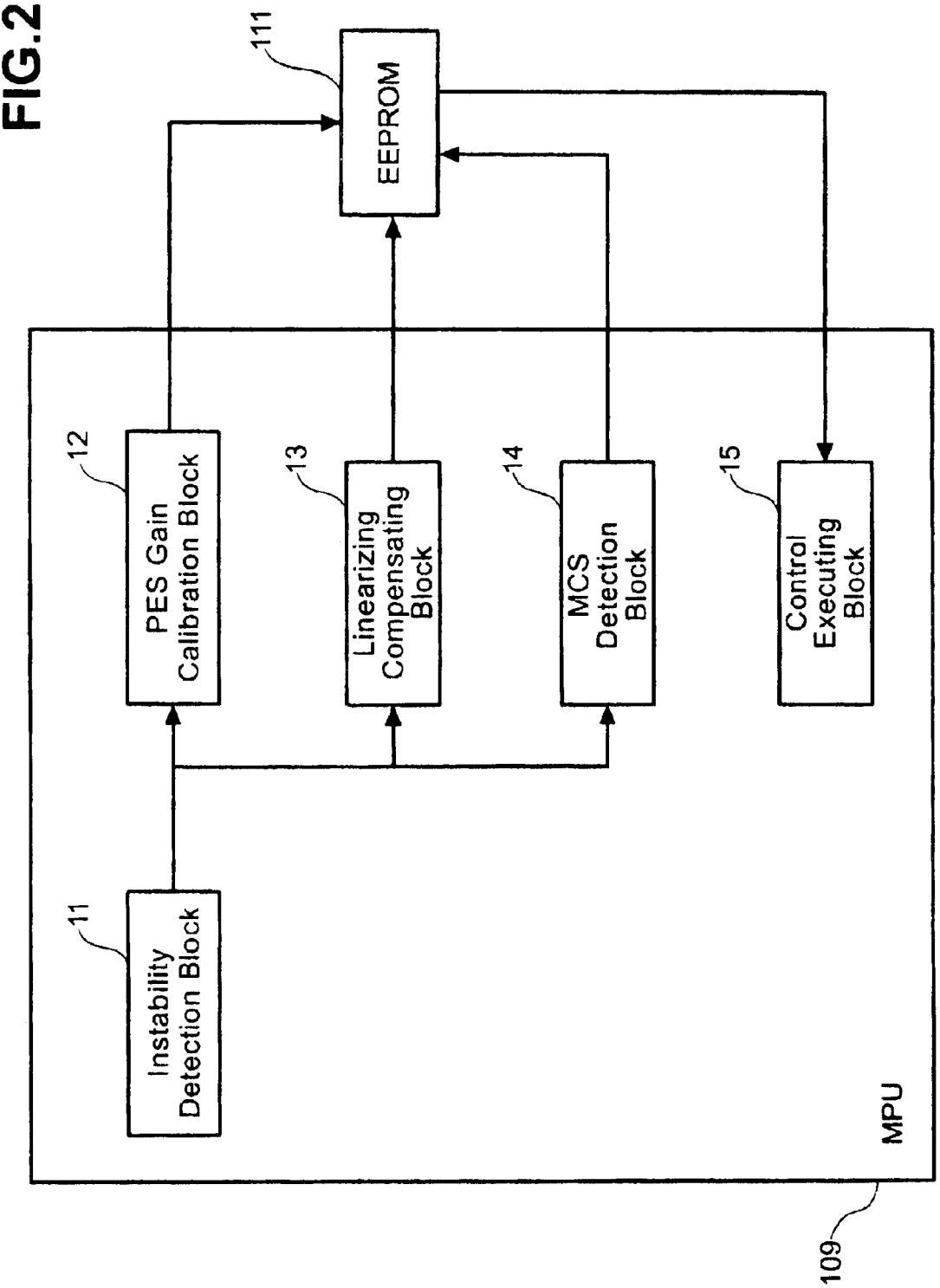
FIG. 2 shows the functional configuration of an MPU in a positioning control mechanism for a magnetic head of the embodiment.

FIG. 2 shows a functional configuration of the MPU 109 to implement the positioning control mechanism for the magnetic head 103 in the present embodiment.

As shown in FIG. 2, the MPU 109 includes an instability detection block 11 as state change detecting means for judging whether the magnetic head 103 has a state change due to instability, a PES gain calibration executing block 12 and linearizing compensation block 13 as adjusting means for performing PES adjustment and a MCS detecting block 14 to detect the MCS of the magnetic head 103. Further, the MPU 109 is provided with a control executing block 15 which executes positioning control for the magnetic head 103 by using parameters obtained by the initial adjustment or parameters obtained through processing by the PES gain calibration executing block 12, linearizing compensation block 13 and MCS detecting block 14.

These functions are implemented by executing programs stored in the EEPROM 111 incorporated in the hard disk drive 100. Note that the functions of the MPU 109, shown in FIG. 2, are elements to configure and re-adjust the positioning mechanism of the present embodiment. Needless to say, the MPU 109 is provided with general other control functions.

At a prescribed timing, the instability detecting block 11 judges whether the magnetic head 103 has a state change due to instability. To be concrete, firstly, the instability detecting block 11 acquires information about the gain of the VGA (Variable Gain Amplifier) of the read write channel 108 and information about the balance of amplitude between the read signals of bursts A and B (or C and D) which are respectively obtained in the read write channel 108 from the magnetic head 103. The VGA is an amplifier which receives a read signal acquired by the magnetic head 103 reading magnetic information recorded on the magnetic disk 101 and normalizes the amplitude of this read write signal to a level appropriate in the internal analog circuit of the read write channel 108. Although a conventional read write channel 108 detects only the symmetricalness in amplitude of the read signal of data recorded on the magnetic disk, it is obvious that this processing can also be applied to the read signals of bursts included in the servo pattern.

Then, the information about the gain of the VGA and the information about the balance of amplitude between the read signals of bursts A and B are compared by the instability detecting block 11 with their respective initial values which were obtained by the aforementioned initial adjustment. Then, if a difference between an acquired value and its initial value exceeds a preset threshold, the instability detecting block 11 judges that, the magnetic head 103 has a state change due to instability.

The PES gain calibration executing block 12 re-performs gain PES calibration done as the initial adjustment to calibrate the gradients of PES gains including MPES and SPES gains. This is because the instability changes the sensitivity of the magnetic head 103 and therefore changes the gradients of PES gains from the one determined by the initial calibration, resulting in making the MPES gains discontinuous with the SPES gains. The gradients of PES gains are re-calibrated so that appropriate PES gains can be calculated.

In this case, since the parameters to be used in calculating appropriate PES gains from actual burst values are changed from the initial values (determined by the initial adjustment), these parameters stored in the EEPROM 111 are updated.

The linearizing compensation block 13 re-performs the linearizing compensation done as initial adjustment to linearize PES gains including MPES and SPES gains. This is because the instability has changed the sensitivity of the magnetic head 103 and therefore makes the initial compensation inconsistent, resulting in non-linear PES gains. Compensation is made again in order to linearize the PES gains.

In this case, since the parameters to be used in processing burst values for compensation are change from the initial values (determined by the initial adjustment), these parameters stored in the EEPROM 111 are updated.

The MCS detecting block 14 detects the MCS of the magnetic head 103 if the magnetic head 103 has a state change caused by instability. Since the physical center of the magnetic head 103 usually agrees with its magnetic center, both have so far been called commonly as the MCS. However, the magnetic center of the magnetic head 103 is sometimes dislocated from the physical center due to instability as shown in FIG. 5, the MCS is used hereinafter to refer to the magnetic center.

Detection of the MCS is done by reading a special pattern recorded on the magnetic disk 101. To be concrete, firstly, the magnetic head 103 seeks a certain track, erases data from the track (CD Erase) and writes a repetitive pattern there. The data region is erased in advance in order to prevent unrelated data from being read.

Then, while the magnetic heads 103 is moved across the track, the above-mentioned repetitive pattern is read and the amplitude of the read signal is measured. The position (e.g., some division of the 256 divisions of the track) of the magnetic head 103 where the read signal shows the largest amplitude is calculated relative to the center of the track (division 128 of the 256 divisions). From this relative position, it is recognized how the MCS of the magnetic head 103 is dislocated from the physical center.

In this case, information about the recognized MCS dislocation is stored in the EEPROM 111 and will be taken into consideration when readjustment (updating parameters) is done by the PES gain calibration executing block 12 and linearizing compensation block 13.

The control executing block 15 calculates a PES from burst signals read by the magnetic head 103 to make necessary compensation by using parameters stored in the EEPROM and positions the magnetic head 103 to an appropriate position in a desired track on the magnetic disk 101. Initially used parameters acquired from the EEPROM 111 are those determined by the initial adjustment. After re-adjustment is done by the PES gain calibration executing block 12 and linearizing compensation block 13, parameters updated by this re-adjustment are used. In addition, information about the dislocation of the MCS of the magnetic head 103 obtained by the MCS detecting block 14 is reflected in the positioning control as necessary.

Figure 6:
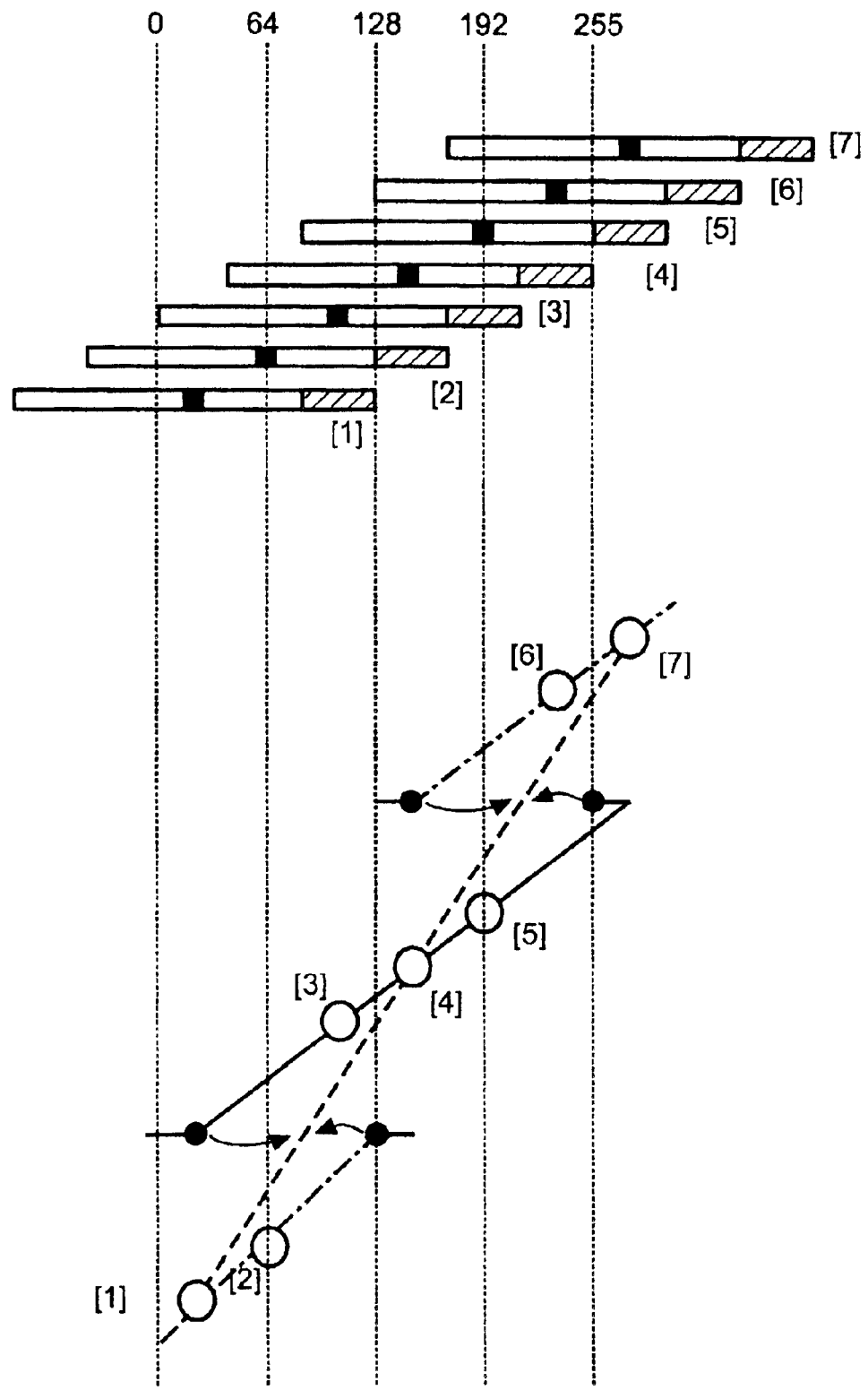
FIG. 6 is a diagram for explaining the relation between the position of a magnetic head relative to a track on a magnetic disk and the PES gain when the MCS of the magnetic head is dislocated.

FIG. 6 is a diagram explaining the relation between the position of the magnetic head 103 relative to a track on the magnetic disk 101 and the PES gain when the MCS of the magnetic head 103 is dislocated. In FIG. 6, the shaded rightmost portion of the magnetic head 103 is state-changed due to instability.

In FIG. 6 similar to FIG. 4, seven positions ([1] through [7]) are assumed and the PES gains corresponding to these positions are plotted (hollow circles) on their respective lines. To recognize the position of the magnetic head 103, the SPES according to the burst values of bursts C and D is used when the magnetic head 103 is at positions [1] and [2]. Likewise, the MPES according to the burst values of bursts A and B is used at positions [3], [4] and [5] and the SPEC according to the burst values of bursts C and D is used at positions [6] and [7].

Here, similar to FIG. 4, PES gains for MPES and SPES are assumed and represented by a solid line and dashed lines, respectively. An ideal PES gain characteristic is represented by a broken line.

Comparing positions [1] through [7] with the plotted PES gains in FIG. 6 makes it found that the MCS of the magnetic head 103 determined from the PES gain is dislocated from the physical center of the magnetic head 103. Accurate positioning of the magnetic head 103 is made possible by recognizing this dislocation and reflecting it in the positioning.

FIG. 6 shows that PES gains are made discontinuous by a sate change in the magnetic head 103 due to instability. The sensitivity (head gain) of the magnetic head 103 is to be calibrated by processing of the PES gain calibration executing block 12 so as to make the PES gains continuous.

Figure 7:
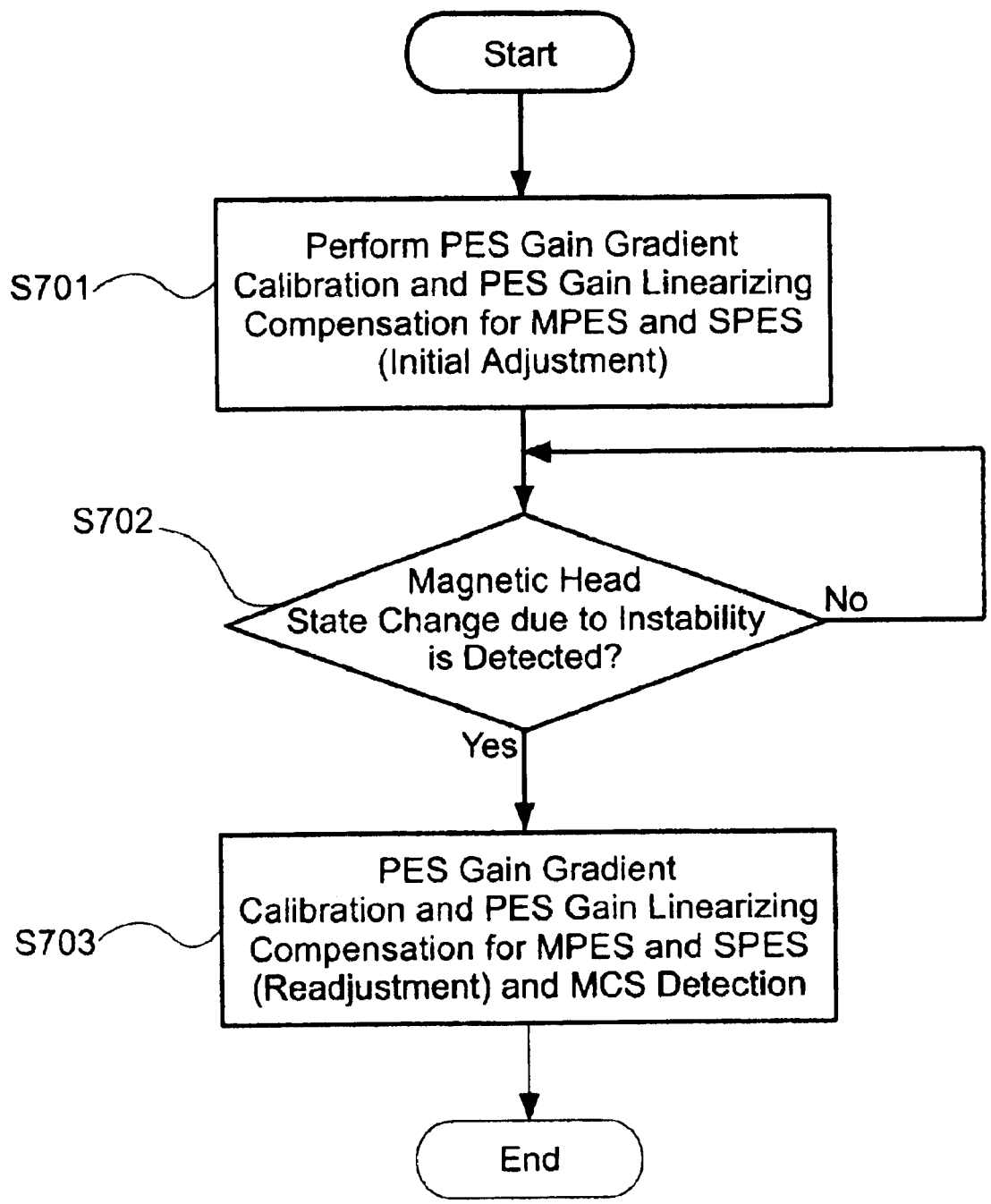
FIG. 7 is a flowchart for explaining the general operation to adjust the positioning control mechanism in the embodiment.

Then, the adjusting operation of the magnetic head positioning control mechanism according to the present embodiment will be described. FIG. 7 is a flowchart illustrating the general operation for adjusting the positioning control mechanism in the present embodiment.

As shown in FIG. 7, the positioning control mechanism incorporated in the hard disk drive 100 according to the present embodiment goes through initial adjustment in the manufacture process or the like of the hard disk drive 100 in which the gradient of PES gains including MPES and SPES gains is calibrated and PES gain linearizing compensation is done (Step 701).

Then, assume that the magnetic head 103 has a state change due to instability as a result of its aged deterioration or a shock given to the hard disk drive 100 in use. In this case, the instability detecting block 11 detects this state change (Step 702). If it is judged by the instability detecting block 11 that a state change has occurred, the positioning mechanism is re-adjusted by the PES gain calibration executing block 12 and the linearizing compensation block 13. In addition, MCS detection is done by the MCS detecting block 14. It is judged whether the MCS is dislocated or not according to the detection result. If judged as dislocated, this dislocation is taken into consideration in the re-adjustment of the positioning mechanism.

Detection of a state change in the magnetic head 103 by the instability detecting block 11 can be done, for example, when data read/write is performed on the magnetic disk 101 in the hard disk drive 100. It is also possible to perform the detection on background when the hard disk drive 100 is in the standby state.

Figure 8:
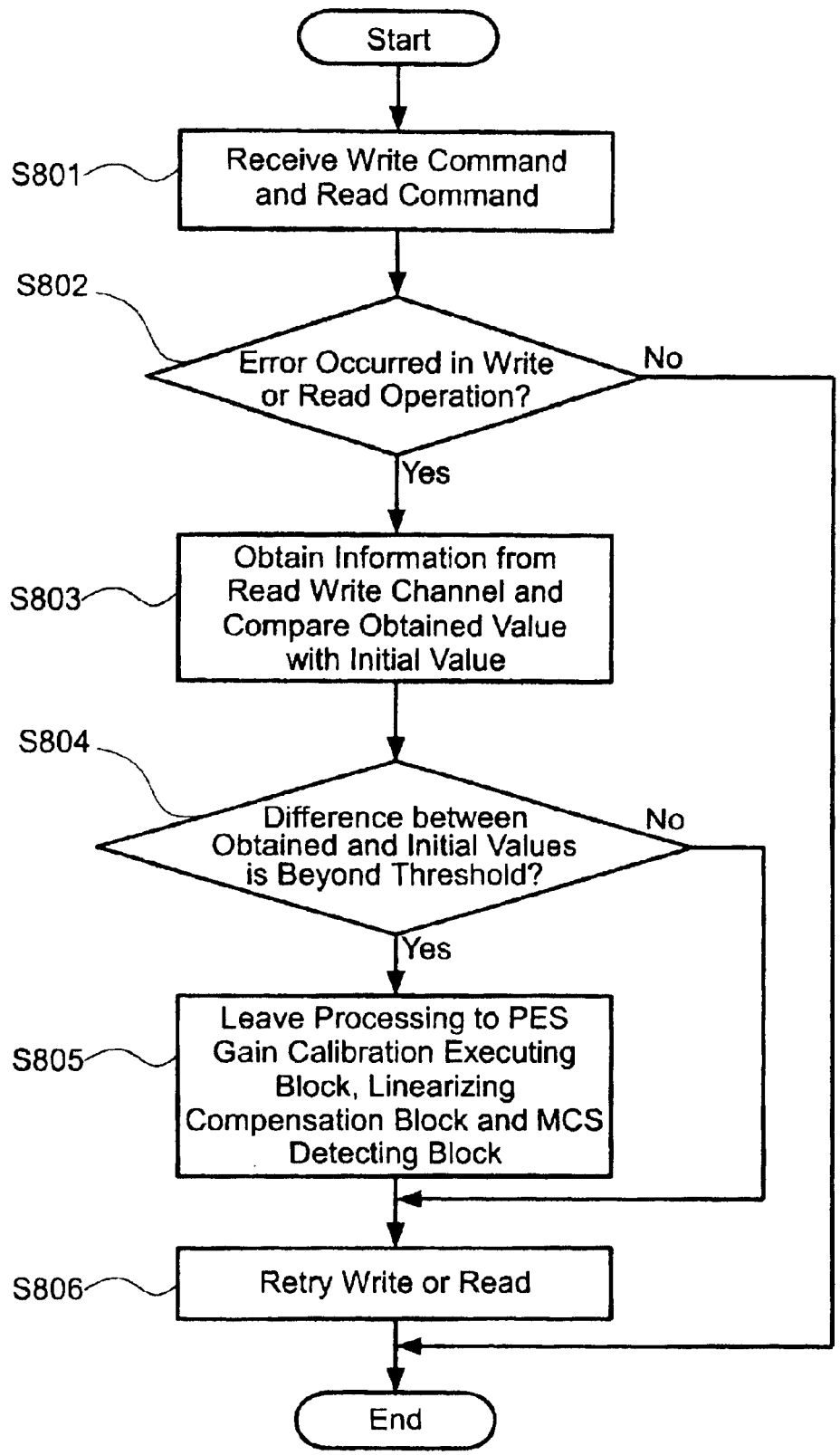
FIG. 8 is a flowchart for explaining a procedure followed by an instability detecting block which is designed to operate when data is read or written.
Figure 9:
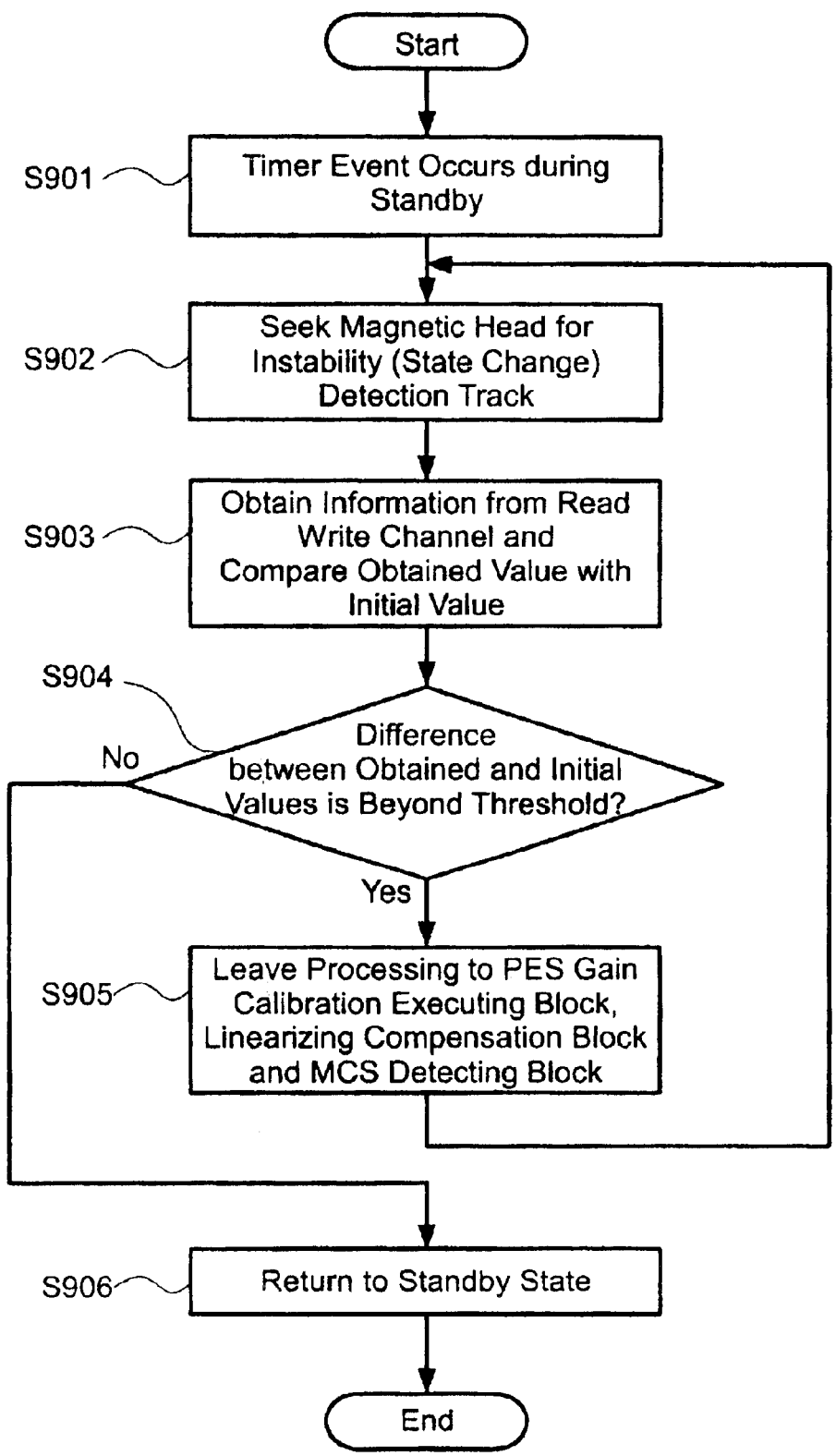
FIG. 9 is a flowchart for explaining a procedure followed by an instability detecting block which is designed to operate when the hard disk drive is in the standby state.

FIG. 8 is a flowchart for explaining a procedure followed by the instability detecting block 11 which operates when data is read or written. FIG. 9 is a flowchart for explaining a procedure followed by the instability detecting block 11 which operates when the hard disk drive 100 is in the standby state.

If detection of a state change in the magnetic head 103 is to be done when data is read or written (see FIG. 8), the instability detecting block 11 receives the data write command or data read command and checks if a write error or read error has occurred (Steps 801 and 802). If no error has occurred, processing is terminated.

If an error has occurred, the MPU 109 is informed by the read write channel 108 of the gain of the VGA and the balance of amplitude between the read signals of bursts A and B (or bursts C and D). Then, the instability detecting block 11 compares these information (obtained values) with the initial values obtained by the initial adjustment (see Step 701 in FIG. 7). If the difference between the obtained and initial values is within a preset threshold, it is judged that no state change due to instability has occurred (Step 804). Then, the write or read received in Step 801 is retried by the MPU 109 (Step 806).

If the difference between the obtained and initial values is beyond the threshold, the instability detecting block 11 judges that a state change has occurred in the magnetic head 103 due to instability and leaves processing to the PES gain calibration executing block 12, linearizing compensation block 13 and MCS detecting block 14 (Step 805). Then after the positioning control mechanism is adjusted by these functions, the write or read received in Step 801 is retried by the MPU 109 (Step 806).

If detection of a state change in the magnetic head 103 is to be performed when the hard disk drive 100 is in the standby state (see FIG. 9), an event (timer event) is, for example, periodically generated to judge whether the magnetic head 103 has a state change (Step 901). This event can be designed to be generated, for example, by a command from a host computer or by the MPU 109 itself under program control. If this event occurs, the MPU 109 makes the magnetic head 103 seek a specific track used to detect a state change in the magnetic head (Step 902). This track may be either an ordinary data track or a track where a pattern specialized for detection of a state change in the magnetic head 103 is recorded. Note that if there are a plurality of magnetic disks 103 in the hard disk drive 100, the following operation is repeated for each magnetic head 103 after a specific cylinder is sought out by the magnetic heads 103.

Then the MPU 109 is informed by the read write channel 108 of the gain of the VGA and the balance of amplitude between the read signals of bursts A and B (or bursts C and D). Then, the instability detecting block 11 compares these information (obtained values) with the initial values obtained by the initial adjustment (see Step 701 in FIG. 7). If the difference between the obtained and initial values is within a preset threshold, it is judged that no state change due to instability has occurred (Step 904). Then, the hard disk drive 100 returns to the standby state (Step 906).

On the other hand, if the difference between the obtained and initial values is beyond the threshold, the instability detecting block 11 judges that a state change has occurred in the magnetic head 103 due to instability and leaves processing to the PES gain calibration executing block 12, linearizing compensation block 13 and MCS detecting block 14 (Step 905). Then after the positioning control mechanism is adjusted by these functions, processing goes back to Step 902 in which the adjusted obtained values are compared with the initial values. This adjustment and comparison are repeated until the difference between the obtained and initial values becomes within the threshold before the hard disk drive returns to the standby state (Steps 904 and 905).

As described so far, the present invention allows a magnetic storage device to accurately control the position of the magnetic head even if the state of the magnetic head has changed.

What is claimed is:

1. A positioning control mechanism for a magnetic head in a magnetic storage device, said positioning control mechanism comprising:
    state change detection means for judging whether a state change has occurred in the magnetic head;
    position error signal adjustment means for adjusting a position error signal if it is judged by said state change detection means that a state change has occurred in the magnetic head, wherein said position error signal is obtained by processing read signals read from a magnetic recording medium by the magnetic head; and
    control execution means for performing positioning control of the magnetic head by using parameters obtained through processing by said position error signal adjustment means.

2. A positioning control mechanism for a magnetic head according to claim 1 wherein said state change detection means, said position error signal adjustment means and said control execution means are implemented as functions of a MPU (Micro Processing Unit) to control an operation of the magnetic storage device.

3. A positioning control mechanism for a magnetic head according to claim 1 wherein said state change detection means compares a gain of a variable gain amplifier constituting a channel circuit incorporated in the magnetic storage device and a balance of amplitude between read signals read from the magnetic recording medium with their respective initial values and, based on the result of the comparison, judges whether a state change in magnetic characteristic has occurred due to instability in the magnetic head.

4. A positioning control mechanism for a magnetic head according to claim 1 wherein said position error signal adjustment means adjusts a gain of the position error signal obtained by processing read signals read from the magnetic recording medium by the magnetic head so as to change continuously according to the displacement of the magnetic head.

5. A positioning control mechanism for a magnetic head according to claim 1 wherein said position error signal adjustment means compensates gains of plural position error signals obtained by processing read signals retrieved from plural points in a track on the magnetic recording medium so as to have a linear relation with the position of the magnetic head.

6. A positioning control mechanism for a magnetic head according to claim 1 further comprising:
    MCS detection means for detecting a magnetically central section (MCS) of the magnetic head if it is judged by said state change detection means that a state change has occurred in the magnetic head;
    wherein said control execution means performs control for positioning the magnetic head taking into consideration the magnetically central section detected by said MCS detection means after the occurrence of the state change.

7. A positioning control mechanism for a magnetic head according to claim 6 wherein said MCS detection means detects the magnetically central section of the magnetic head after the occurrence of said state change based on the position of the magnetic head at which a read signal obtained by the magnetic head which reads a prescribed pattern recorded in a prescribed track on the magnetic disk has the largest amplitude while the magnetic head is moved across the track.

8. A magnetic storage device which magnetically reads and writes data from and to a magnetic recording medium, said magnetic storage device comprising:
    a magnetic head which is mounted on an actuator and reads information recorded on the magnetic recording medium;
    a voice coil motor which operates the actuator to move the magnetic head to a desired track on the magnetic recording medium;
    a MPU (Micro Processing Unit) provided with a positioning control function to position the magnetic head by controlling the voice coil motor; and
    a channel circuit which obtains read signals from burst signals read by the magnetic head from the recording medium on which the burst signals are recorded and feeds back information about the read signal to the MPU;
    wherein, if a state change is detected in the magnetic head based on said information obtained from the channel circuit, the MPU updates parameters which are to be used by said positioning control function according to the state change.

9. A magnetic storage device according to claim 8 wherein said channel circuit feeds back a gain of a variable gain amplifier constituting said channel circuit and a balance of amplitude between said read signals obtained from said burst signals to the MPU as information about said read signals.

10. A magnetic storage device according to claim 8 wherein if it is detected that said state change has occurred in the magnetic head, the MPU updates parameters for adjusting a gain of a position error signal obtained by processing read signals read from the magnetic recording medium by the magnetic head so that the gain changes continuously according to the displacement of the magnetic head.

11. A magnetic storage device according to claim 8 wherein if it is detected that said state change has occurred in the magnetic head, the MPU updates parameters for compensating gains of plural position error signals obtained by processing read signals read from plural points in a track on the magnetic recording medium by the magnetic head so that the gains have a linear relation with a position of the magnetic head.

12. A magnetic storage device according to claim 8 wherein if it is detected that said state change has occurred in the magnetic head, the MPU detects the magnetically central section of the magnetic head and reflects the detected magnetically central section in an update of said parameters.

13. A magnetic head positioning control method by which a magnetic head for reading and writing data from and onto an magnetic recording medium is located on a track of the magnetic recording medium, comprising the steps of:

setting, according to magnetic characteristics of the magnetic head, parameters which are used for positioning control of the magnetic head;

judging whether a state change has occurred in the magnetic head; and if it is judged that a state change has occurred in the magnetic head, updating said parameters according to the state change.

14. A magnetic head positioning control method according to claim 13 wherein in said step of updating parameters, parameters are updated which adjust a gain of a position error signal obtained by processing read signals read from the magnetic recording medium by the magnetic head so that the gain changes continuously according to the displacement of the magnetic head.

15. A magnetic head positioning control method according to claim 13 wherein in said step of updating parameters, parameters are updated which compensate gains of plural position error signals obtained by processing read signals read from plural points in a track on the magnetic recording medium by the magnetic head so that the gains have a linear relation with a position of the magnetic head.

16. A magnetic head positioning control method according to claim 13 further comprising the step of:

detecting the magnetically central section of the magnetic head if it is detected that a state change has occurred in the magnetic head;

wherein, in said step of updating parameter, the parameters are updated taking into consideration the magnetically central section of the magnetic head detected after the occurrence of said state change.

\* \* \* \* \*